US008126982B2

(12) United States Patent
Nidd

(10) Patent No.: US 8,126,982 B2
(45) Date of Patent: Feb. 28, 2012

(54) METHOD, NETWORK DEVICE AND COMPUTER PROGRAM PRODUCT FOR PERFORMING SERVICE DISCOVERY IN A PERVASIVE NETWORK

(75) Inventor: Michael Nidd, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 2379 days.

(21) Appl. No.: 10/062,108

(22) Filed: Feb. 1, 2002

(65) Prior Publication Data

US 2002/0120750 A1   Aug. 29, 2002

(30) Foreign Application Priority Data

Feb. 16, 2001   (CH) ................................. 01810156.8

(51) Int. Cl.
*G06F 15/16* (2006.01)
(52) U.S. Cl. ........................................................ 709/217
(58) Field of Classification Search .................. 709/208, 709/249, 217–219, 223–229; 340/825.01
See application file for complete search history.

(56) References Cited

U.S. PATENT DOCUMENTS

| 5,568,612 A * | 10/1996 | Barrett et al. ................. 709/203 |
| 5,987,011 A * | 11/1999 | Toh ................................ 370/331 |
| 6,097,727 A * | 8/2000 | Peters ............................. 370/400 |
| 6,101,528 A * | 8/2000 | Butt ................................ 709/203 |
| 6,182,224 B1 * | 1/2001 | Phillips et al. ..................... 726/6 |
| 6,286,047 B1 * | 9/2001 | Ramanathan et al. ........ 709/224 |
| 6,430,601 B1 * | 8/2002 | Eldridge et al. .............. 709/206 |
| 6,446,108 B1 * | 9/2002 | Rosenberg et al. ........... 709/203 |
| 6,470,189 B1 * | 10/2002 | Hill et al. ....................... 455/517 |
| 6,532,368 B1 * | 3/2003 | Hild et al. ..................... 455/515 |
| 6,604,140 B1 * | 8/2003 | Beck et al. .................... 709/226 |
| 6,618,355 B1 * | 9/2003 | Gulliford et al. ............. 370/230 |
| 6,633,757 B1 * | 10/2003 | Hermann et al. .......... 455/414.1 |
| 6,684,331 B1 * | 1/2004 | Srivastava ..................... 713/163 |
| 6,751,200 B1 * | 6/2004 | Larsson et al. ................ 370/255 |

(Continued)

FOREIGN PATENT DOCUMENTS

JP          344163       12/2001

OTHER PUBLICATIONS

Layton et al. "How Bluetooth Works" HowStuffWorks.com.*

*Primary Examiner* — Benjamin R Bruckart
(74) *Attorney, Agent, or Firm* — Derek S. Jennings; Anne Vachon Dougherty

(57) ABSTRACT

Described are a method, wireless network device and computer program element each for performing service discovery in a pervasive wireless network (WLAN) operating according to standards such as the Bluetooth standards comprising access protocols and service discovery protocols enabling a network device (CL1):

a) in a first state to access a remote device (SR2) in order to obtain information for the set-up of a connection,
b) in a second state to set up a connection to the remote device (SR2) and retrieve information related to services provided by the remote device (SR2), the discovered information being required to configure connections to the remote device (SR2) and using the related services, and
c) in a third state the device (CL1) publishes and thus actively forwards retrieved service information to other devices (CL2, SR3) which in turn update their lists of services available from devices (CL, SR) connected to the pervasive network (WLAN).

12 Claims, 5 Drawing Sheets

U.S. PATENT DOCUMENTS

| | | | |
|---|---|---|---|
| 6,757,262 B1 * | 6/2004 | Weisshaar et al. | 370/310 |
| 6,789,126 B1 * | 9/2004 | Saulpaugh et al. | 709/245 |
| 6,839,757 B1 * | 1/2005 | Romano et al. | 709/226 |
| 6,862,594 B1 * | 3/2005 | Saulpaugh et al. | 707/10 |
| 6,931,429 B2 * | 8/2005 | Gouge et al. | 709/203 |
| 6,957,429 B1 * | 10/2005 | Sekijima et al. | 718/100 |
| 6,980,524 B1 * | 12/2005 | Lu et al. | 370/254 |
| 2001/0003191 A1 * | 6/2001 | Kovacs et al. | 709/226 |
| 2001/0033554 A1 * | 10/2001 | Ayyagari et al. | 370/328 |
| 2002/0075940 A1 * | 6/2002 | Haartsen | 375/132 |
| 2002/0120685 A1 * | 8/2002 | Srivastava et al. | 709/203 |
| 2003/0208595 A1 * | 11/2003 | Gouge et al. | 709/225 |

* cited by examiner

METHOD, NETWORK DEVICE AND COMPUTER PROGRAM PRODUCT FOR PERFORMING SERVICE DISCOVERY IN A PERVASIVE NETWORK

The present invention relates to a method, a network device and a computer program product for performing service discovery in a pervasive wireless network such as an ad-hoc network operating according to the Bluetooth specification (see [1], J. Bray, F. Sturman, Bluetooth: Connect Without Cables, Overview).

BACKGROUND OF THE INVENTION

Pervasive computing is, as described in [2], Brent A. Miller, Robert A. Pascoe, Salutation Service Discovery in Pervasive Computing Environments, IBM® Pervasive Computing White Paper, February 2000, the next evolution of network computing, which evolved from client server computing. The appearance of new information appliances and types of connectivity is spurring a new form of networking. Users of mobile computing devices such as notebooks, mobile phones or palm tops frequently require to transfer data to other mobile or to fixed devices for example for storing, displaying, printing or transmitting said data. For the replacement of cables previously used to connect the corresponding computing devices, networking systems, such as Bluetooth, have been created which allow the set up of unmanaged, dynamic networks also described as ad-hoc networks or pervasive networks.

Computing devices using for example the Bluetooth technology may initiate the set up of an ad-hoc network, at this stage a so called point to point piconet, or may access an already set up ad-hoc network which by this may be extended from a point to point piconet to a point to multipoint piconet or to a scatternet. An important aspect of modern ad-hoc networks is that various devices which offer different services may access the network or may be accessed through the network. Mobile phones or digital cameras may wirelessly be connected to notebooks which themselves establish links to printers. Devices may instantaneously enter or leave ad-hoc networks. A remote control for example which is carried through a building may sequentially connect to various different devices which then can be set to a desired operating condition by the user.

In order to achieve an optimal configuration of the ad-hoc network means and technologies must be provided to the devices to declare and communicate their requirements and services.

Technologies have been developed, for example by The Salutation Consortium (see http://www.salutation.org), which are intended to provide devices, applications and services, which meet in a communication setting, the ability to find out about each other by means of electronic messages or salutations. Once the concerned devices have exchanged information about their capabilities, they may tailor their interactions accordingly. A salutation manager SLM may be incorporated in the Bluetooth protocol stack which is described below.

The Bluetooth protocol stack, which is shown in FIG. 1 and described in [4], Bluetooth Protocol Architecture, pages 4 and 5, comprises Bluetooth Core Protocols 10. These include Base band and Link Controller Protocols 20, Link Manager LM 30, Logical Link and Adaptation Protocol LL2CAP 40 which together with a radio part 50 and a host controller interface HCI 60 correspond to the Physical Layer, Data Link Layer, Network, Layer Transport Layer and Session Layer of the OSI reference model (see [1], page 7). Further shown in FIG. 1 are Telephony Control Protocols TCS and Cable Replacement Protocol RFCOMM 80 which supports Object Exchange Protocol OBEX 90, Wireless Application Protocol WAP 100 and a set of Telephony Control AT Commands 110 based on the well-known industry standard Hayes Smartmodem commands.

The Bluetooth Core protocols further comprise a service discovery protocol SDP 120 that enables the retrieval of information that can be used to configure the stack to support several end-user applications. In particular, the service discovery protocol SDP 120 can be used to locate services that are available in the vicinity of the user. Having located available services, a user may then select to use any of them. However before information can be retrieved from other devices corresponding connections have to be established.

To establish new connections, the procedures inquiry and paging are used. Referring to FIG. 2, a Bluetooth device may change from the STANDBY state 200 to a Page Scan (PAGE) 210 or Inquiry Scan (INQUIRY) 220 sub-state to scan for page or inquiry messages or to page 230 or inquiry 240 to initiate the process of establishing a new connection (see [3], page 98, state diagram of the Bluetooth link controller).

Referring to FIG. 5, in the paging and inquiry procedures, the device access code DAC and the inquiry access code IAC are used respectively. A unit in the page scan 210 or inquiry scan 220 sub state correlates against the respective access codes with a matching correlator.

The inquiry procedure enables a unit to discover which units are in range, and what the device addresses and clocks are. In the Bluetooth system, an inquiry procedure is used in applications where the destination's device address is unknown to the source. In the INQUIRY sub state 220, the discovering unit continuously transmits an inquiry message and collects the Bluetooth device addresses and clocks of all units that respond to the inquiry message. The discovering unit can then, if desired, change to the PAGE sub state 210 and set up a connection to any of the units which have replied to the inquiry message. When carrying out a successful page attempt, the unit will enter the CONNECTION state 250 as a master. The unit responding to the page message will enter the CONNECTION state 250 as a slave.

The inquiry message broadcasted may comprise a General Inquiry Access Code GIAC inquiring for any Bluetooth device or a Dedicated Inquiry Access Code DIAC which indicates the class of devices that should respond.

The intervals between scan activities are typically not more than 2-3 seconds.

In practise a user may activate a Bluetooth supported device such as a notebook and start a word processing application. For the printout of a document, the notebook requires the services of a printer. The notebook therefore emits a series of inquiry messages comprising a Dedicated Inquiry Access Code DIAC which specifies the required devices and eventually a printer replies with a Frequency Hop Synchronisation packet FHS which contains all the information required for establishing a connection (see [3], page 56).

To retrieve information from a remote device, a connection is established by means of the described access procedures. Then the services that are available from or via the connected remote device are located by means of the service discovery protocol SDP 120. The service discovery protocol defines the protocols and procedures that to be used by the service discovery application in the local device to locate services provided by server applications in the remote device as well as the attributes of those services. The server maintains a list of service records that describe the characteristics of services associated with the server. Each service record contains information about a single service. As seen in FIG. 4 a service record contains at least a Service Record Handle (attribute ID 0x000) and a Service Class ID List (attribute ID 0x0001). Other service attributes are optional (see [3], page 358, service attribute definitions).

FIG. 3 shows the Bluetooth protocols and supporting entities involved in the service discovery profile. A service discovery user application 310 in a local device 300 interfaces with a service discovery client $SDP_C$ 320 in order to send service inquiries to, and to receive service inquiry responses from, a service discovery server $SDP_S$ 330 of a remote device 340 which is connected to a database DB 350 comprising a list of service records. Service discovery entities SDP use the connection oriented transport service CO 360 of the logical link and adaptation entity L2CAP 40 which in turn uses baseband asynchronous connectionless links ACL 380 to ultimately carry SDP protocol data units SDP PDUs 390 shown in FIG. 4.

After the required service information has been collected, initiated by the paging process a further connection can be set up to the remote device 340. The application 360 sends its requirements through the host controller interface HCI 60 to the link manager LM 30 which in turn sets up a connection as required (see [1], pages 13-16).

As detailed above the process of accessing a remote device 340 by means of inquiry access codes and subsequently retrieving information from the remote device 340 comprises numerous steps which are performed in time intervals of considerable length. In an error free environment, following a inquiry message it may take up to ten seconds to receive all responses from remote devices 340. Setting up connections 250 and retrieving the information by means of the service discovery procedures is time consuming as well.

Using a Dedicated Inquiry Access Code DIAC instead of a General Inquiry Access Code GIAC which indicates the class of devices that should respond can save time.

However since the numbers of services and the devices which may participate in an ad-hoc network are expected to increase significantly, the time required for service discovery compared to the time left for actually using the discovered services becomes relatively high. Further, it is important to note that devices are entering and leaving an ad-hoc network within short time intervals and may nevertheless require the use of available service. Keeping the list of available services updated is therefore a continuously running process. In addition, communication traffic in such networks is often bursty so that time for administrative tasks such as service discovery may severely be limited during certain time periods since devices which are engaged in communications are performing service discovery procedures with low priority.

To facilitate access to service information, it has been proposed to establish a device in the network collecting all available service information which then can be retrieved by other devices. This however introduces a static element into a dynamic network which does not fit well into a dynamic network. It would be desirable to provide a method, a network device and a computer program product for improving the described service discovery procedures used in a pervasive network. It would also be desirable to transfer service information to a device of a pervasive or an ad-hoc network practically without absorbing capacity of the communication channels. It would be further desirable to avoid multiple downloading of identical service information from a device connected to the network. Still further, it would be desirable to specify an implementation of the invention in a system operating according to the Bluetooth standards.

SUMMARY OF THE INVENTION

In accordance with the present invention, there is now provided a method for performing service discovery in a pervasive wireless network comprising a plurality of devices including a network device, a remote device and other devices, the method comprising the network device: accessing the remote device to obtain information for establishment of a connection to the remote device; establishing a connection to the remote device; and, retrieving information related to services provided by the remote device for configuring connections to the remote device and for using the services; characterised in that the method comprises the network device forwarding the retrieved information to the other network devices, the other devices updating lists of services available from the plurality of device connected to the pervasive network based on the received information.

The method preferably comprises forwarding service information received by a network device acting as a master to connected network devices acting as slaves and forwarding service information received by a network device acting as slave to connected network devices acting as master.

The method may comprise sensing traffic on a carrier and the forwarding of service information is performed during idle periods. Also, the method may comprise forwarding service information over control channels. The method may further comprise forwarding service information in a pervasive network operating according to the Bluetooth standards via default packet types being activated for control purposes when no user data is to be sent. In a preferred embodiment of the present invention, the method comprises forwarding service information in a pervasive network operating according to the Bluetooth standards via undefined packet types. In a particularly preferred embodiment of the present invention, the method comprises packing service information to be forwarded into a payload of packets and delivering to a connected network device.

Viewing the present invention from another aspect, there is now provided a wireless network device for performing service discovery in a pervasive wireless network, the device comprising: means for accessing a remote device in order to obtain information for the set-up of a connection to the remote device via the network, means for establishing a connection to the remote device and for retrieving information related to services provided by the remote device, the retrieved information being for configuring connections to the remote device before using the discovered services, characterised in that the network device comprises a service discovery protocol for forwarding retrieved service information to other devices via the network to facilitate the other devices updating lists stored therein of services available from devices connected to the network.

The network device preferably comprises means for sensing traffic on a carrier and forwarding service information during idle periods. The network device may comprise means for forwarding service information over control channels. In preferred embodiments of the present invention, the network device comprises means for packing the service information into a payload of packets and delivering said packets to a connected device.

Viewing the present invention from yet another aspect, there is now provided a computer program element comprising computer program code means which, when loaded in a processor of devices for a data communications network, configures the processor to perform a method for performing service discovery in a pervasive wireless network as herein before described.

This advantageously improves service discovery procedures used in a pervasive network. This also permits transfer of discovered service information between devices in a pervasive or an ad-hoc network practically without absorbing capacity of communication channels. This further avoids multiple downloading of identical service information from network devices respective servers thus optimising the performance of the pervasive network. In addition service information is further distributed by the receiving devices in a chain reaction. The present invention is particularly although not exclusively suitable for systems operating according to the Bluetooth standards.

In preferred embodiments of the present invention, time to configure the connections within the pervasive network is significantly reduced, so that availability of all services provided by connected network devices is established within a short period. Hence, network devices according to the present invention, such as a remote control carried from one room to another, quickly receive the required service information.

Since traffic on a carrier often appears in bursts the carrier is sensed in a preferred embodiment and service information is only published during idle periods.

In a pervasive network operating according to the Bluetooth standards service information is preferably published by means of default packet types such as NULL and/or POLL which are being activated for control purposes when no user data is to be sent. As an alternative packet types with type codes such as 1100 or 1101 are used which yet are undefined in the applied standards.

The service information is preferably packed into the payload of packets delivered to a connected network device.

BRIEF DESCRIPTION OF THE DRAWINGS

Some of the objects and advantages of the present invention have been stated, others will appear when the following description of preferred embodiment of the present invention is considered together with the accompanying drawings, in which.

DETAILED DESCRIPTION OF THE PREFERRED EMBODIMENTS

Figure 1:
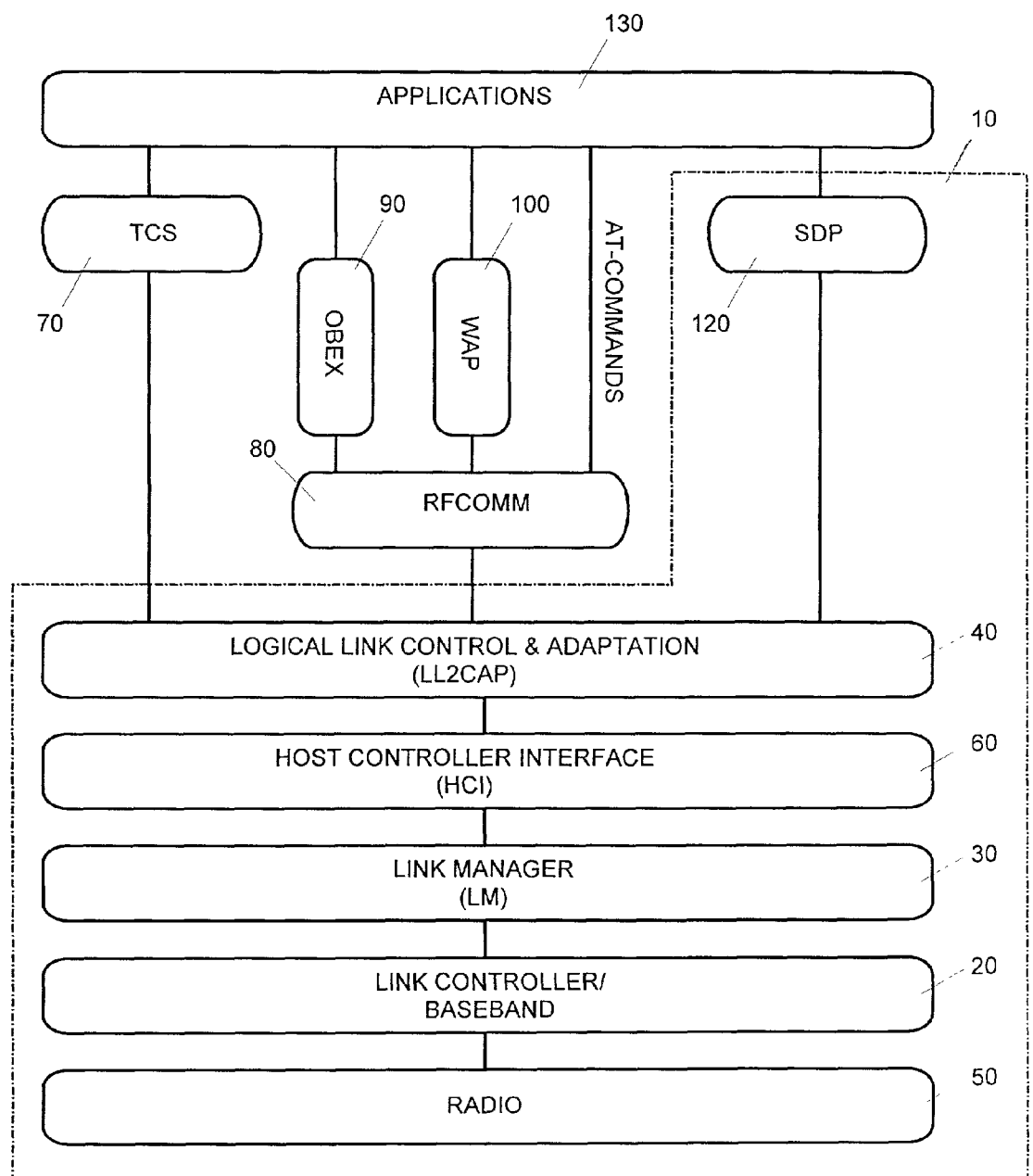
FIG. 1 is a block diagram of a Bluetooth protocol stack.

FIG. 1 shows a Bluetooth protocol stack comprising Bluetooth Core Protocols 10. The Bluetooth core protocols include Radio part 50, Base band and Link Controller Protocols 20, Link Manager LM 30, Logical Link and Adaptation Protocol L2CAP 40 and Service Discovery Protocol SDP 120. Host Controller Interface HCI 60 connects a host to Bluetooth system entities as shown in [3] on pages 524 and 525.

As described above, FIG. 1 also shows Telephony Control Protocols TCS 70, Cable Replacement Protocol RFCOMM 80 which supports Object Exchange Protocol OBEX 90, Wireless Application Protocol WAP 100 and a set of Telephony Control AT Commands 110 through which applications 130 may access a Bluetooth network.

Pervasive networks or ad-hoc networks, such as a network operating according to the Bluetooth standards, provide access to various devices each offering different services. These networks implement service discovery or salutation protocols that enable the retrieval of service information from servers connected to the network that can, in turn, be used to configure the stack to support several end-user applications.

Figure 2:
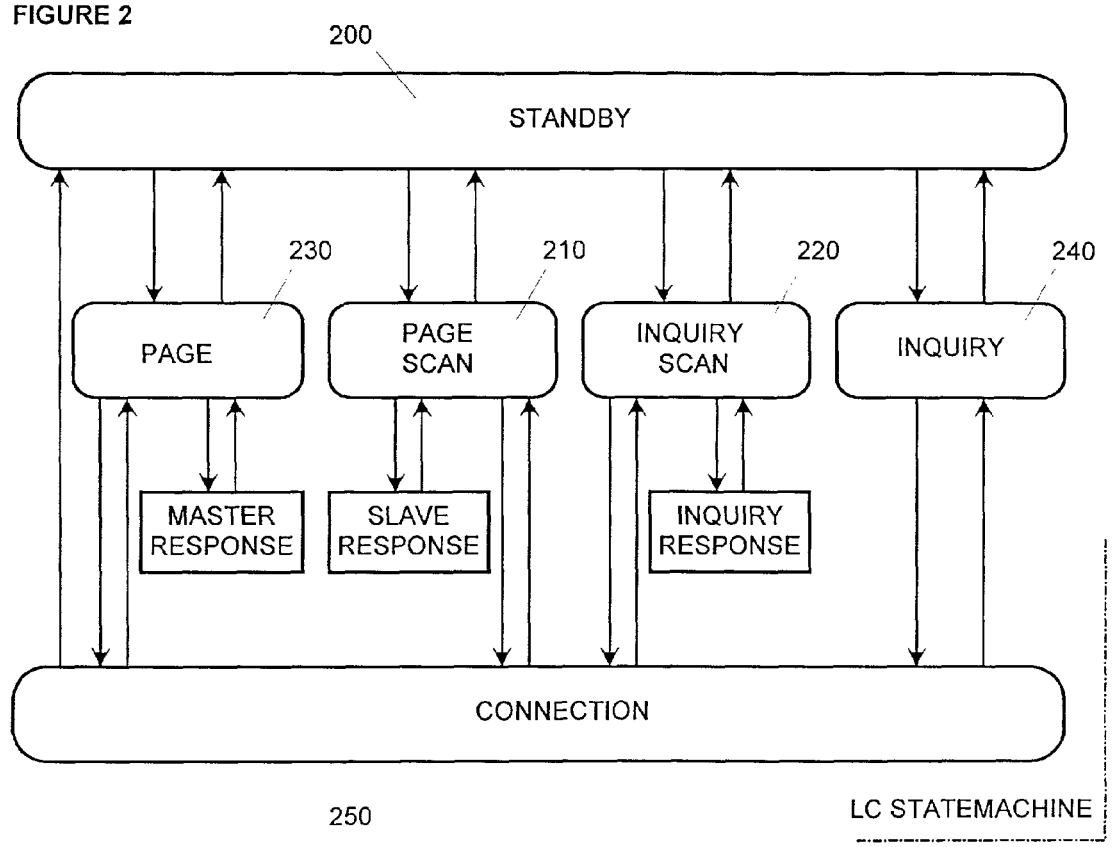
FIG. 2 is a state diagram of the Bluetooth link controller.

FIG. 2 shows the state diagram of the Bluetooth link controller which comprises an INQUIRY state 240 which may be entered out of a STAND BY state 200 or a CONNECTION state 250. In the INQUIRY state 240, a Bluetooth device broadcasts inquiry messages which are sensed by Bluetooth devices that are in an INQUIRY SCAN state 220. Upon receipt of an inquiry message which comprises a General or a Dedicated Inquiry Access Code, GIAC or DIAC, a remote network device may reply with a Frequency Hop Synchronisation packet FHS which contains all the information required for establishing a connection. The Bluetooth device may therefore change from the INQUIRY state 240 to the PAGE state 230 to establish a connection 150 to the remote device. The remote device receives the page messages when it gets into a PAGE SCAN state 210 and participates in the communication as a slave.

Figure 3:
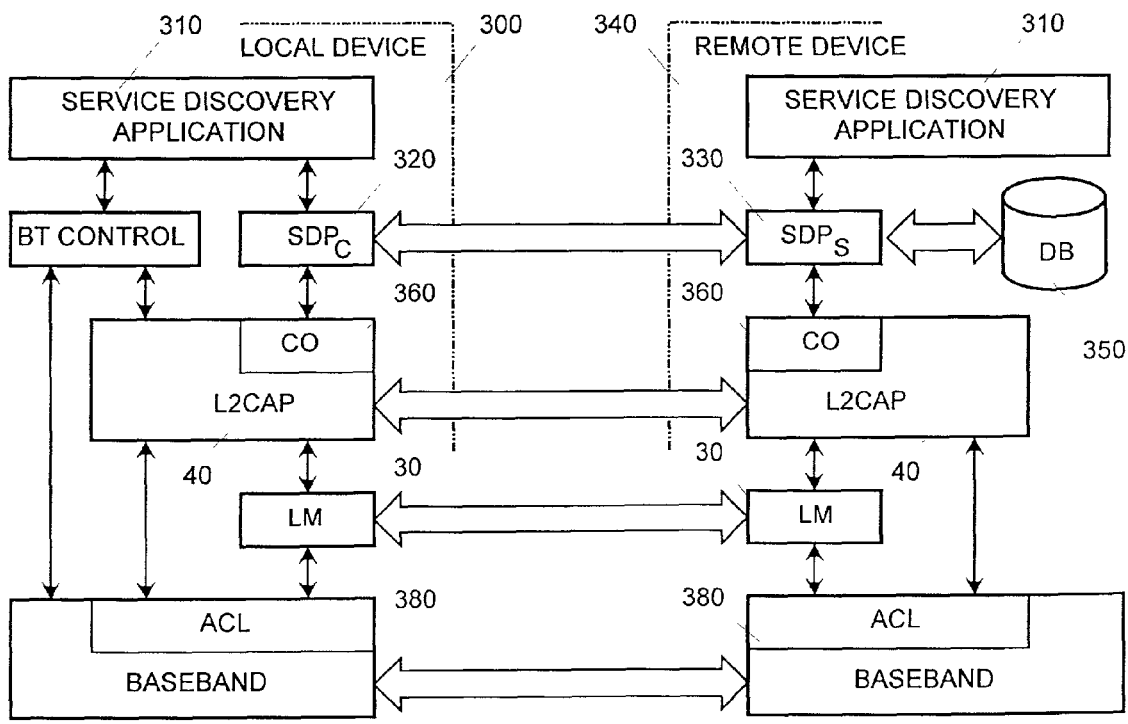
FIG. 3 is a block diagram of Bluetooth protocols and supporting entities involved in the service discovery protocol.

Referring to FIG. 3, a local device 300 connects to a remote device 340 as described above. The service discovery entity $SDP_C$ 320 of the local device 300 connects as a client to the service discovery entity $SDP_S$ 330 of the remote device 340 to retrieve the required service information.

Figure 4:
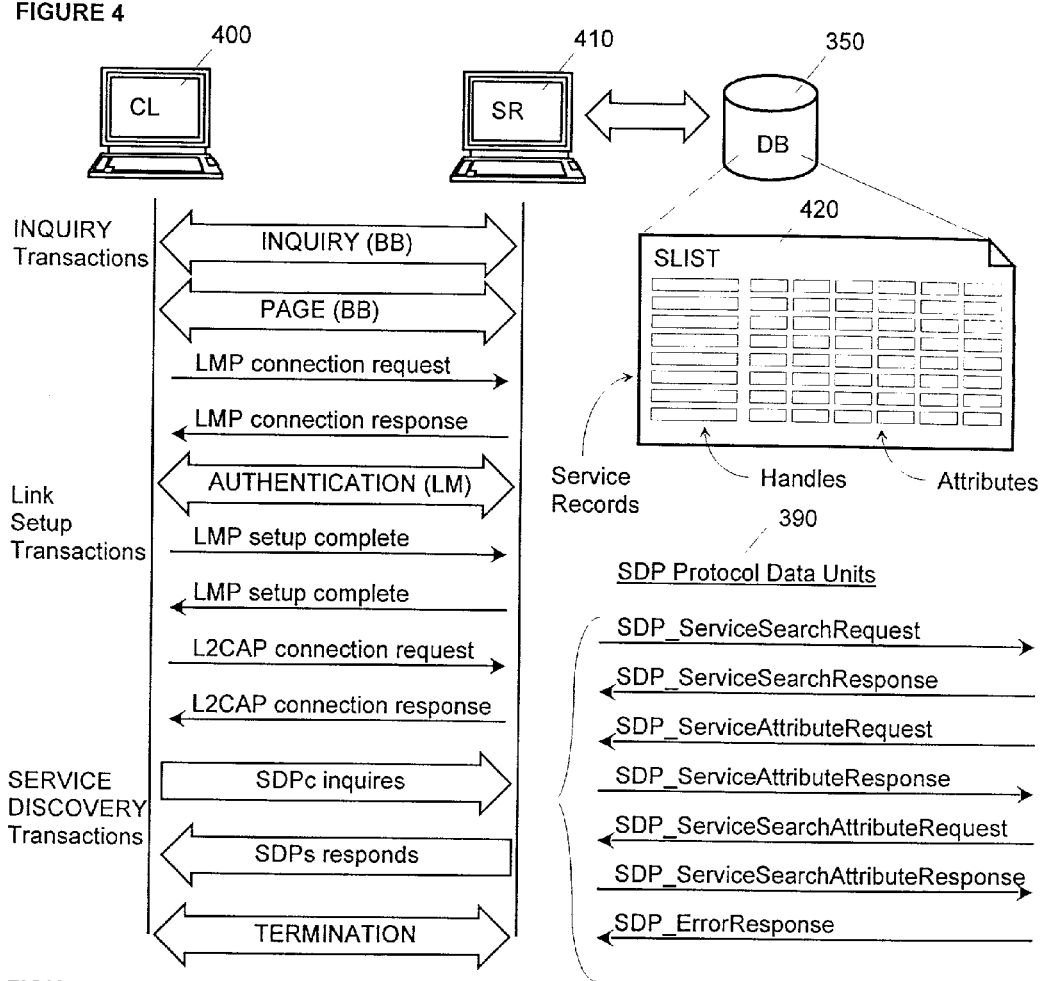
FIG. 4 is a block diagram of inquiry, link set-up and service discovery messages exchanged between a client and a server.
Figure 5:
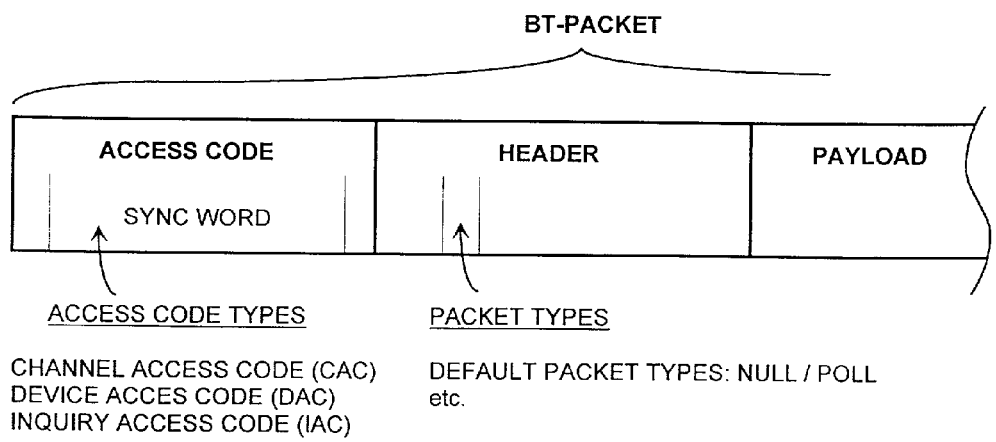
FIG. 5 is a block diagram of a Bluetooth packet.

The above described inquiry, set-up and service discovery procedures are shown in FIG. 4 in detail. After the inquiry and page transactions, the link manager LM 30 of a client CL 400 sets up a connection. A logical channel is provided by an entity working according to the Logical Link and Adaptation Protocol L2CAP 40 which is adapted to the Service Discovery Protocol $SDP_C$ 320. To retrieve service information from a the database DB 350 and specifically a service list SLIST 420 of a server SR 410 stored in the database DB 350, SDP protocol data units as described in [3], pages 344 and 345 are exchanged between the service discovery peer entities $SDP_C$ 320 and $SDP_S$ 330. After the download of service records contained in the list SLIST 420, the connection is terminated. A new connection may be set up and configured to use a service offered by the server SR 410.

As described above, the process of accessing a remote device 340 via a General Inquiry Access Code GIAC, or via a Dedicated Inquiry Access Code DIAC, and subsequently retrieving information from the remote device 340 comprises numerous steps which are performed in time intervals of considerable length.

An example of a method according to the present invention designed to improve known service discovery procedures is described below with reference to FIG. 6.

Figure 6:
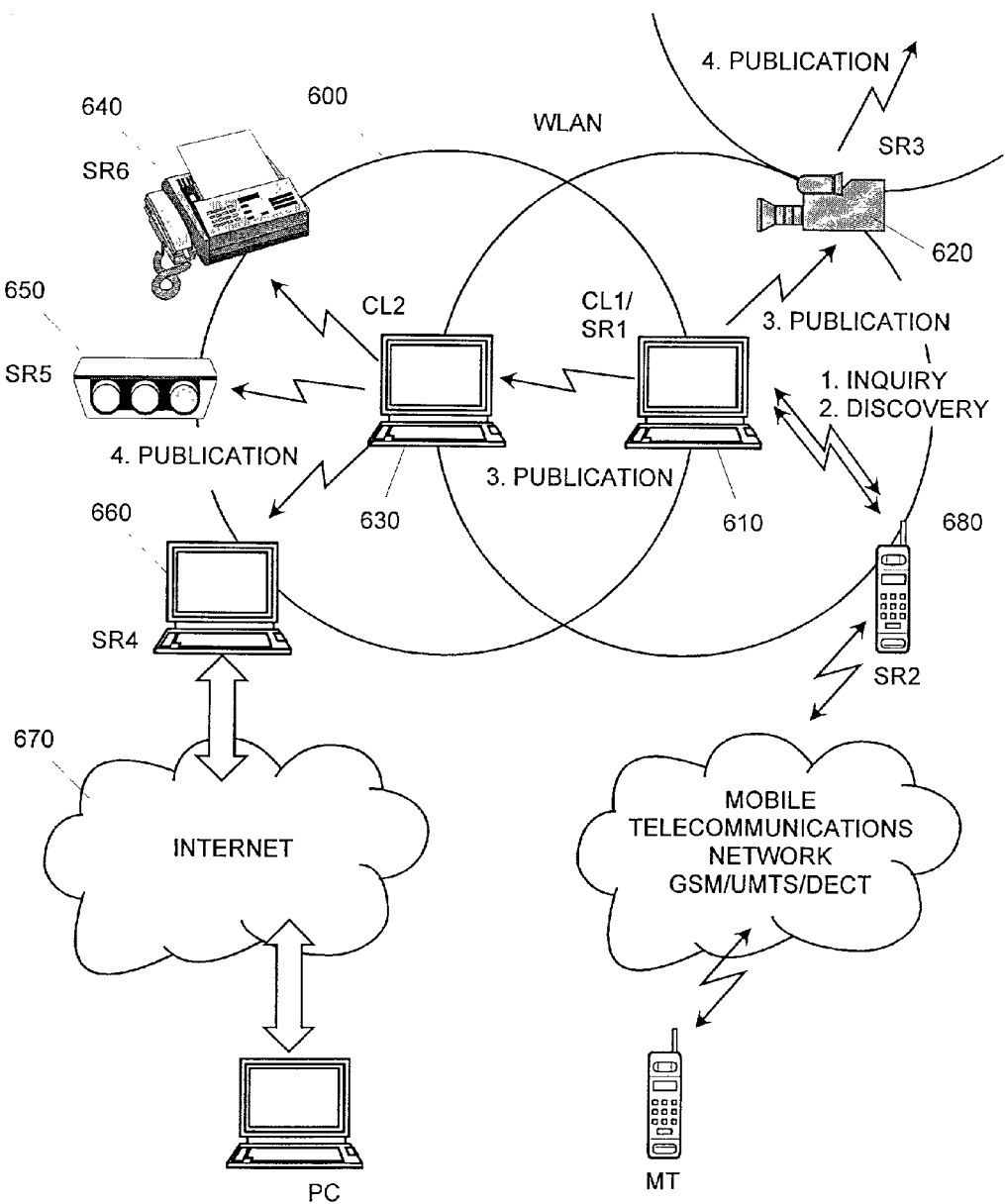
FIG. 6 is a block diagram of a pervasive network comprising a plurality of networks devices embodying the present invention; and, FIG. 7 is another state diagram of the Bluetooth link controller.

FIG. 6 shows a wireless local area network 600 such as an ad-hoc network WLAN contained in an office comprising a first notebook CL1 610 acting as a master towards a camera SR3 620 and acting as a slave towards a second notebook computer CL2 630 which, in turn, acts as a master towards a facsimile device SR6 640, a beamer SR5 650 and a permanently installed standard personal computer SR4 660 connected to the Internet 670.

As described above, devices may enter and leave an ad-hoc network sporadically while the ad-hoc network is self-configuring its connections accordingly. According to a preferred embodiment of the present invention, this is performed in three steps. In the event that a mobile phone SR2 680, which may belong to the owner of notebook CL1 610, is carried into the office, in INQUIRY SCAN state 220, the phone SR2 680 will detect inquiry messages from notebook CL1 610 and reply with a Frequency Hop Synchronisation packet FHS. The notebook CL1 610 may then change to PAGE state 230 and set up a connection to the mobile phone SR2 680 which detects page messages while in PAGE SCAN state 210. The notebook CL1 610 acting as client will then retrieve information related to services provided by the mobile phone SR2 680.

Figure 7:
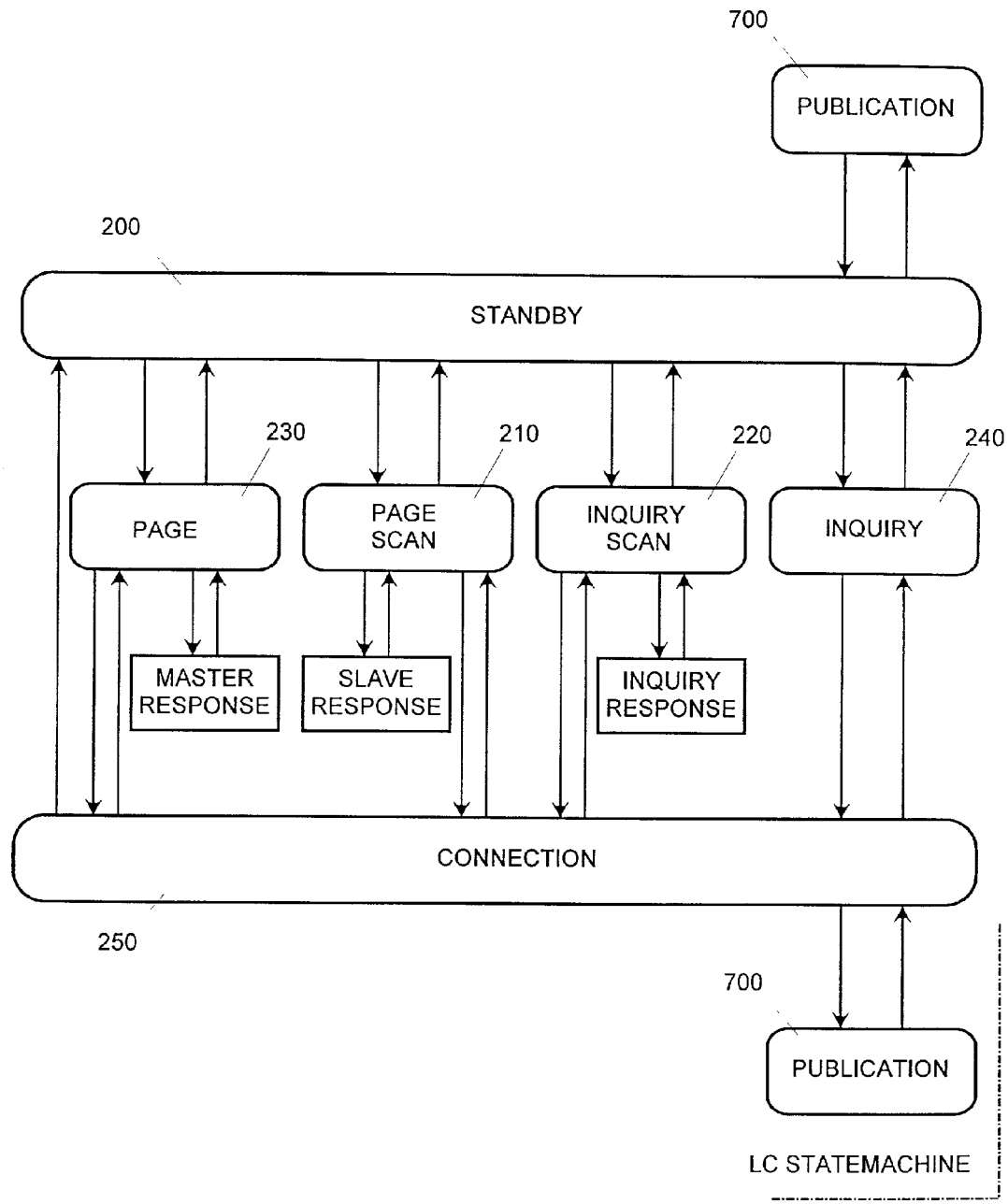

Referring now to FIG. 7, the notebook CL1 610 will then, after discovery of service information, change into a PUBLICATION state 700, in which the discovered service information is published respective actively forwarded to the other network devices, camera SR3 620 and notebook CL2 630, to which the notebook CL1 610 is connected. This step avoids multiple downloading of the same service information from mobile phone SR2 680. It should be noted that the PUBLICATION state 700 is similar to the CONNECTION state 250 except that the POLL and NULL packets of the CONNECTION state 250 are replaced, in the PUBLICATION state 700, by POLL_PUBLICATION and NULL_PUBLICATION packets. These will be described shortly. The PUBLICATION state 700 may be regarded as a subset of the CONNECTION state 250.

Service information published by notebook CL1 610 respectively forwarded to its master, notebook CL2 630, and to its slave, camera SR3 620, is then further forwarded by the receiving devices CL2 630 and SR3 610 to connected network devices SR4 640, SR5 650, and SR6 660 acting as slaves to notebook CL2 630 or to another network device (not shown) acting as master to camera SR3 620.

Information is therefore quickly distributed over the ad-hoc network permits the necessary adjustments of the configuration settings whenever a change within the network occurred.

Before the publication is performed, the associated device preferably senses the traffic on the available carriers so that the service information can be transferred, for example, between bursts during idle periods. Discovered service information can therefore be published without placing an additional load onto the network system.

While transfer of discovered service information is possible over user channels, the information is preferably published over control channels.

In a pervasive network operating according to the Bluetooth standard service information is preferably transferred by means of default packet types such as NULL and/or POLL which are activated for control purposes when no user data is to be sent.

The packet types used in a Bluetooth piconet are described in [3], on pages 54-58 and 81-84. On asynchronous connectionless links the default type is always the NULL packet for the master and the slave. The NULL packet can be used by the master to allocate the next slave-to-master time slot to the addressed slave. The addressed slave is not forced to respond to the NULL packet. In the event that the master requires a response, it would send a POLL packet.

The Bluetooth system may also be enhanced by type codes such as 1100 or 1101 which are not defined yet for synchronous connection oriented SCO or asynchronous connectionless links ACL. Type code 1100 could therefore be defined as NULL PUBLICATION packet while type code 1101 could be defined as POLL PUBLICATION packet. Receiving network device would therefore identify the enhanced NULL and POLL packet and could unpack the enclosed service information out of the payload segment.

As mentioned above, the present invention can advantageously be used in ad-hoc or pervasive networks operating according to the Bluetooth standards. However, it will be appreciated that the inventive method can also be used in other wireless networks implementing service discovery procedures (see [5], chapter 32, pages 32-1 to 32-14).

The present invention may be applied in network devices without any hardware changes. A network device already operating in the field may easily be updated by means of a computer program product comprising a recording medium storing a computer program embodying an example of the present invention as described above. Alternatively, such a computer program product or element may be loaded into a network device via a data communications network connection.

In summary, herein before described by way of example embodiments of the present invention are a method, wireless network device and computer program element each for performing service discovery in a pervasive wireless network (WLAN) operating according to standards such as the Bluetooth standards comprising access protocols and service discovery protocols enabling a network device (CL1):
  a) in a first state to access a remote device (SR2) in order to obtain information for the set-up of a connection,
  b) in a second state to set up a connection to the remote device (SR2) and retrieve information related to services provided by the remote device (SR2), the discovered information being required to configure connections to the remote device (SR2) and using the related services, and
  c) in a third state the device (CL1) publishes and thus actively forwards retrieved service information to other devices (CL2, SR3) which in turn update their lists of services available from devices (CL, SR) connected to the pervasive network (WLAN).

REFERENCES

[1] J. Bray, F. Sturman, Bluetooth: Connect Without Cables, Prentice Hall Inc., New York 2001
[2] Brent A. Miller, Robert A. Pascoe, Salutation Service Discovery in Pervasive Computing Environments, IBM® Pervasive Computing White Paper, February 2000
[3] Specification of the Bluetooth System, Volume 1, Core, Version 1.0 B, issued by the Special Interest Group (SIG) on Dec. 1, 1999
[4] Bluetooth WHITE PAPER, Bluetooth Protocol Architecture, Version 1.0, issued by the Special Interest Group (SIG) on Aug. 25, 1999
[5] Jerry D. Gibson, THE MOBILE COMMUNICATIONS HANDBOOK, CRC PRESS, Boca Raton 1999, $2^{nd}$ Edition

The invention claimed is:

1. A method for performing service discovery in a pervasive wireless network comprising a plurality of devices including a network device and other devices, wherein lists are maintained and updated for services that are available from the plurality of devices connected to the pervasive network, the method comprising the network device:
  accessing a remote device to obtain information for establishment of a connection to the remote device;
  establishing a connection to the remote device whereby the remote device joins the pervasive wireless network;
  retrieving from the remote device service information related to services provided by the remote device, connection information for configuring connections to the remote device and service usage information for using the services;

updating a list of all network services at said network device based on retrieved service information; and forwarding the retrieved service information to the other network devices for said other network devices to perform updating of lists of services available from the plurality of devices connected to the pervasive network based on the received information.

2. A method according to claim 1, further comprising forwarding service information received by a network device acting as a master to connected network devices acting as slaves and forwarding service information received by a network device acting as slave to connected network devices acting as master.

3. A method according to claim 1, further comprising sensing traffic on a carrier and forwarding service information during idle periods.

4. A method according to claim 1, comprising forwarding service information over control channels.

5. A method according to one of the claim 1, comprising forwarding service information in a pervasive network operating according to the Bluetooth standards via default packet types being activated for control purposes when no user data is to be sent.

6. A method according to claim 5, comprising packing service information to be forwarded into a payload of packets and delivering to a connected network device.

7. A method according to claim 1, comprising forwarding service information in a pervasive network operating according to the Bluetooth standards via undefined packet types.

8. A wireless network device for performing service discovery in a pervasive wireless network (WLAN), wherein lists are maintained and updated for services that are available from the plurality of devices connected to the pervasive network, the device comprising:

a) means for accessing a remote device to obtain information for the set-up of a connection to the remote device via the network, b) means for establishing a connection to the remote device, whereby the remote device joins the pervasive wireless network, and for retrieving from the remote device information related to services provided by the remote device and storing the retrieved information in lists, the retrieved information comprising connection information for configuring connections to the remote device before using the discovered services and service information comprising identification of those services;

c) means for updating a list of all network services at said network device based on retrieved service information; and d) a service discovery protocol for forwarding retrieved service information to other devices via the network to facilitate the other devices in updating lists stored therein of services available from devices connected to the network.

9. A network device according to claim 8, comprising means for sensing traffic on a carrier and forwarding service information during idle periods.

10. A network device according to claim 8, comprising means for forwarding service information over control channels.

11. A network device according to claim 8, comprising means for packing the service information into a payload of packets and delivering said packets to a connected device.

12. A recording medium embodying a computer program element comprising computer program code which, when loaded in a processor of devices for a data communications network, configures the processor to perform a method for performing service discovery in a pervasive wireless network comprising a plurality of devices including a network device and other devices, wherein lists are maintained and updated for services that are available from the plurality of devices connected to the pervasive network, the method comprising the network device:

accessing a remote device to obtain information for establishment of a connection to the remote device;

establishing a connection to the remote device whereby the remote device joins the pervasive wireless network;

retrieving service information from the remote device related to services provided by the remote device, connection information for configuring connections to the remote device and usage information for using the services;

updating a list of all network services at said network device based on said retrieved service information;

forwarding the retrieved information to the other network devices; for said other network devices to perform updating of lists of services available from the plurality of devices connected to the pervasive network based on the received information.

* * * * *